United States Patent Office 2,933,101
Patented Apr. 19, 1960

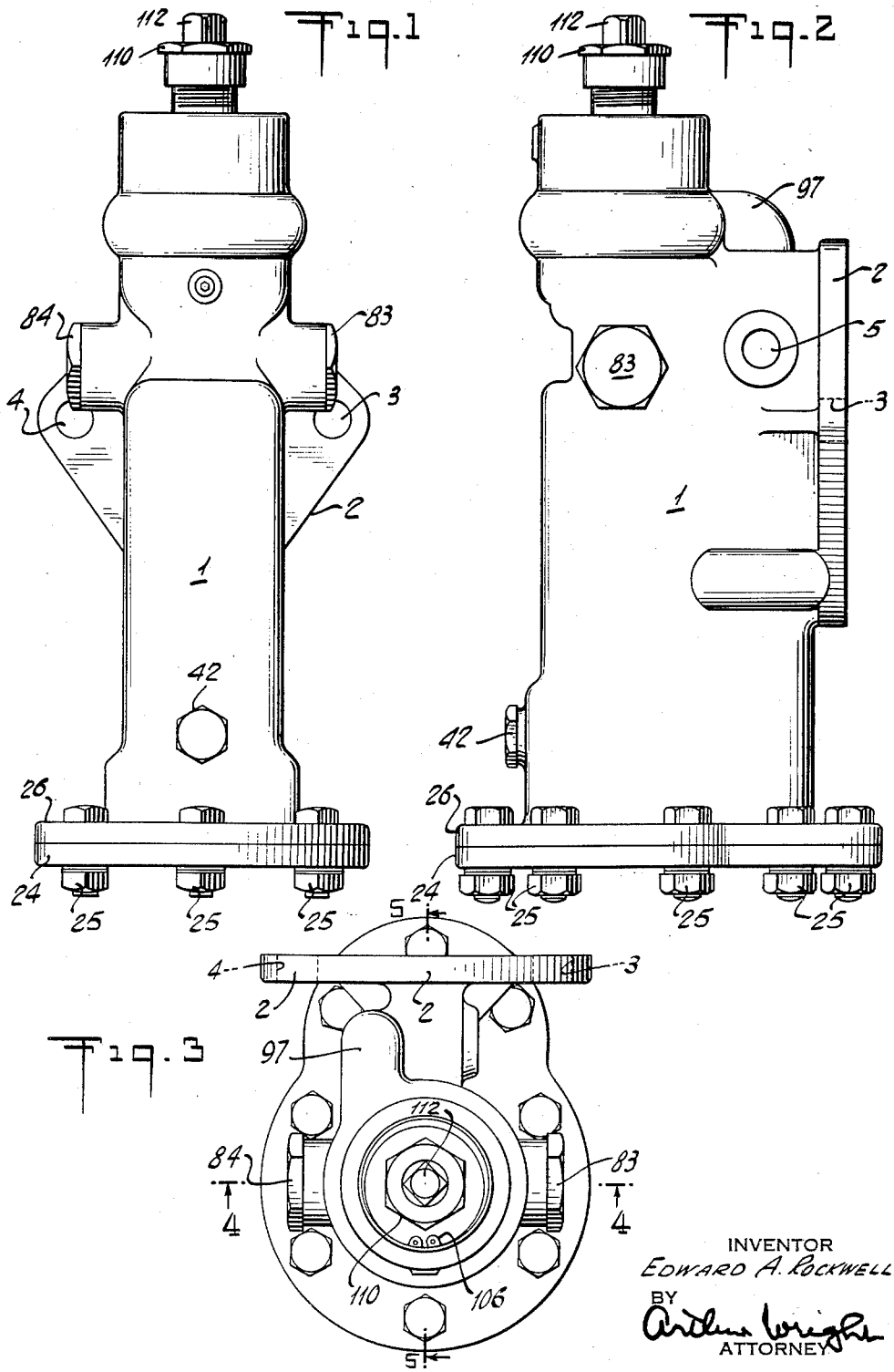

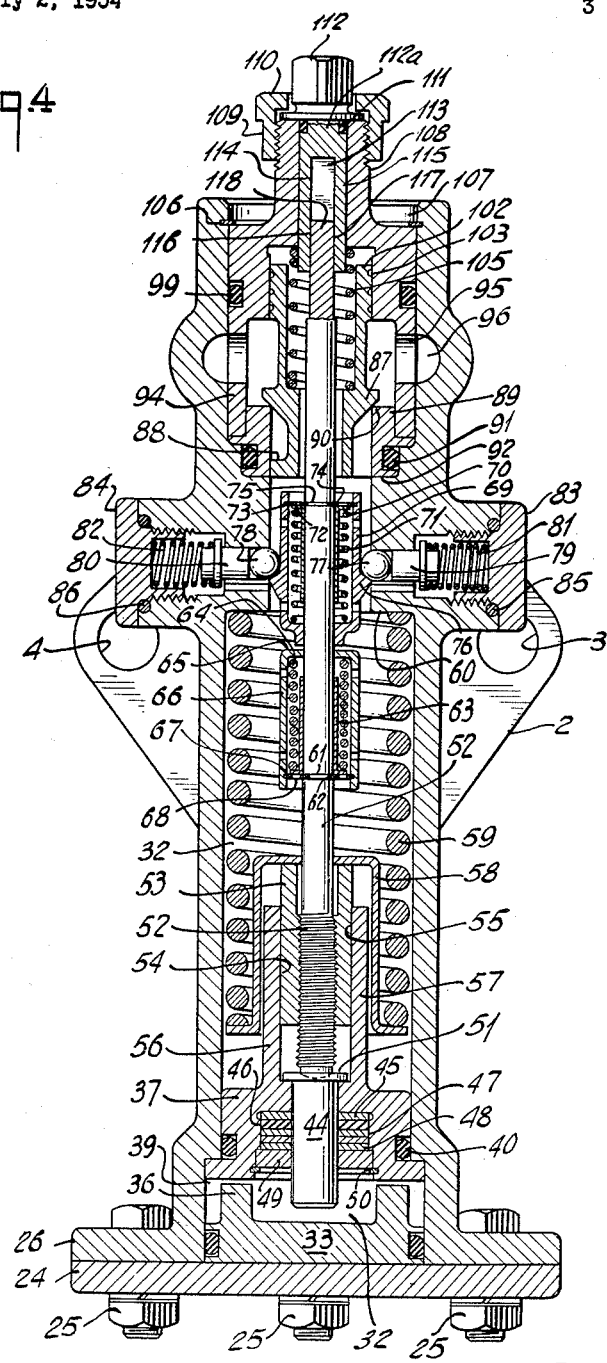

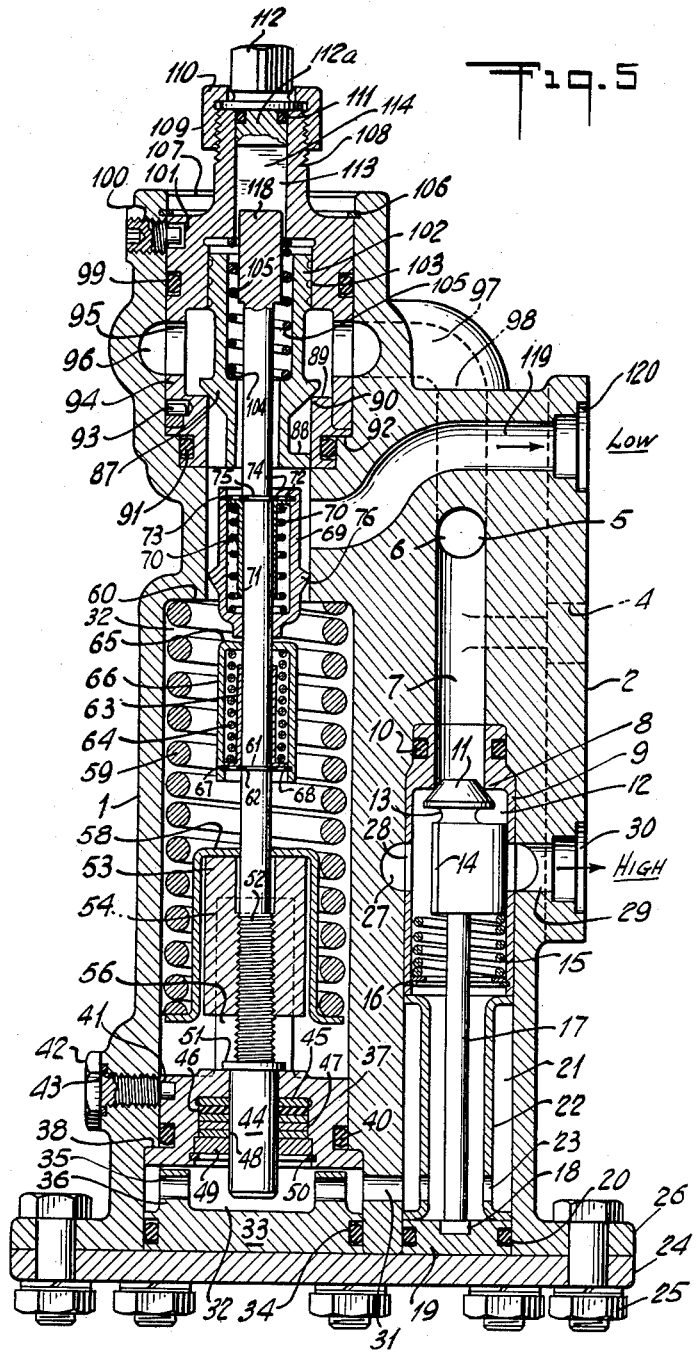

2,933,101
UNLOADING VALVE MECHANISM
Edward A. Rockwell, Los Angeles, Calif.
Application July 2, 1954, Serial No. 440,998
2 Claims. (Cl. 137—509)

My invention relates particularly to an unloading valve which is capable of being used in connection with pressure fluids of various kinds, as for instance in hydraulic systems.

The object of my invention is to provide an unloading valve for use in connection with pressure fluids of all kinds, whereby the pressure supplied from a source of fluid under pressure may be unloaded whenever the pressure supplied for work performance exceeds a desired maximum. My unloading valve mechanism, as above indicated, is capable of being used in connection with various types of apparatus and wherever a fluid under pressure is being supplied for performing work, but, for instance, may be used to advantage in connection with the accumulator in my application upon Power Steering System, Ser. No. 440,993, filed July 2, 1954, now Patent No. 2,896,733 of July 28, 1959, and in my copending application upon Accumulating Apparatus, Ser. No. 440,894, filed July 2, 1954, now Patent No. 2,919,715. A further object is to provide a relief valve which has a smaller spring pressure required to close it than the spring pressure required to open the same, thus reducing to a minimum the work required in closing the valve. Another object of my invention is to provide a simplified form of unloading valve mechanism which may be more readily manufactured and assembled and which may be produced with a minimum number of parts, and so that the parts thereof may be readily accessible. Further objects of my invention will appear from the detailed description of the same hereinafter.

While my invention is capable of embodiment in many different forms, I have shown only one form thereof in the accompanying drawings, in which—

Fig. 1 is a vertical front elevation of an unloading valve which may be used in said system;

Fig. 2 is a side elevation thereof;

Fig. 3 is a plan view of the same;

Fig. 4 is a vertical section of the same taken on line 4—4 of Fig. 3; and

Fig. 5 is a vertical section of the same taken on line 5—5 of Fig. 3.

Referring to the drawings, I have shown an unloader valve casing 1 having a mounting plate 2 provided with holes 3 and 4 for attachment of the unloading valve mechanism to any desired support, as for instance to an automobile chassis in connection with the power steering system above referred to. The said casing 1 has an inlet opening 5 which may be connected to any desired source of fluid under pressure, as for instance a hydraulic brake fluid of any desired character, delivered by a pump (not shown) driven by the automobile engine. Within the casing 1 the inlet 5 is connected to a passageway 6 having a downwardly extending branch 7 which leads to a valve seat 8, on a tubular member 9 having an annular seal 10, on which there is normally seated a conical valve 11 operating within a chamber 12, within which chamber the valve 11 has a valve stem 13 provided with flutings 14 resting on a valve-seating spring 15 within the tubular member 9, where it is held in place by a split ring 16. On the valve stem 13 there is also a rod-like extension 17 to act as a stop, the lower end of which is normally supported above a recess 18 in a disc 19 having a seal 20 supported within a chamber 21 in which there is also located a spring-supporting sleeve 22 having apertures 23, on the upper end of which sleeve 22 the tubular member 9 is retained in place by means of a bottom cover plate 24 secured by screws 25 to a flange 26, on the lower end of the casing 1. The valve 11, thus, acts as a check valve so that by the compression of the spring 15 the liquid from the inlet 5 is permitted to pass into an annular recess 27 through openings 28 in the tubular member 9 and thence into a transverse passageway 29 leading to a high pressure outlet 30 which may lead to the accumulator above referred to.

The lower end of the chamber 21 communicates by a transverse passageway 31 with an end chamber 32 containing a ring 33 having an annular seal 34 and peripheral openings 35 on a cylindrical flange 36 for supporting a sealing ring member 37 against a shoulder 38 located around the interior of an unloading valve chamber 39. The sealing ring member 37 has an external annular seal 40 and a peripheral recess 41 for receiving a locking screw 42 provided with a seal 43. On its interior the ring member 37 is arranged to receive, extending through the same, a pressure responsive plunger 44 extending into the chamber 32 and which passes through a washer 45, a rubber seal 46 and a washer 47, having beneath the same a lock washer 48 overlying a ring 49 held in place by a split ring 50. A flange 51 on the upper end of the plunger 44 acts as a stop against the ring member 37. Above the flange 51 there is a reduced screw-threaded portion 52 cooperating with an internally screw-threaded adjustable rectangular block 53 which is carried between flat faces 54 and 55 on arms 56 and 57 extending upwardly from the ring member 37. The screw-threaded block 53 is, thus, slidably retained within the arms 56 and 57, which are maintained in fixed position by the locking screw 42. On the upper end of the screw-threaded block 53 there is a dished spring-retainer sleeve 58 for holding in place a strong spring 59, resting at its upper end against a shoulder 60 on the interior of the chamber 32, which exerts a force in opposition to the fluid pressure in the chamber 32 exerted on the lower end of the plunger 44. The reduced portion 52 extends upwardly through an opening in the spring-retainer sleeve 58. Above the dished spring-retainer sleeve 58 the reduced portion 52 of the said plunger 44 has an annular recess 61 in which there is retained a split ring 62 aginst which there rests an externally flanged spring-retaining sleeve 63 supporting a helical spring 64, the upper end of which is supported by an internal flange 65 on a spring housing 66 provided with an internal recess 67 in which there is located a split retainer ring 68. Above the spring housing 66 and also located on the reduced portion 52 of the plunger rod there is an upper spring housing 69 supporting within the same a very light helical spring 70, which is lighter even than the spring 64, the upper end of which spring 70 rests against the upper end of a flanged spring-retainer sleeve 71, the upper end of which cooperates with a split ring 72 carried in a recess 73 on the inside of the spring housing 69. The upper end of said spring-retainer sleeve 71, furthermore, cooperates with an inner split ring 74 carried in a recess 75 in the reduced extension 52 of the plunger rod. On the outside of the spring housing 69, furthermore, there is provided an annular snap action tapered flange 76 having beveled faces, the lower one of which is less inclined to the vertical in order to permit the downward valve-closing movement of the plunger 44 to take place more readily than the upward movement of the plunger 44. Each one of said beveled faces is arranged to cooperate with the opposite sides of a pair of snap action balls 77 and 78 which are pressed inwardly, respectively, by means of two flanged plungers 79 and 80 supported by springs 81 and 82, which are carried, respectively, within screw caps 83 and 84 having annular seals 85 and 86, screw-threaded in the sides of the casing 1. The spring 70 is just strong enough to push the lower beveled surfaces on the flange 76 past the balls 77 and 78. In fact there is but a very little differential between the upward and downward spring pressures on the balls 77 and 78, but there is a lesser spring force exerted in the downward valve-closing movement of the plunger 44 than in the upward valve-opening movement of said plunger 44. The reduced extension 52, furthermore, extends upwardly loosely through a tapered relief valve 87 having an apertured flange 88 sliding within a tubular valve seat member 89, having a valve seat 90, and an annular seal 91, which rests against a shoulder 92 on the interior of the casing 1. The arrangement of the springs is such, therefore, as to prevent the spring 70 detracting substantially from the effect of the spring 59 in pulling down the valve 87 into closed position. The tubular valve seat member 89 is, furthermore, held against rotation by a movable pin 93, which also passes through a sleeve 94 supported on the tubular valve seat member 89 and which has apertures 95 in an annular recess 96 having a transverse passageway 97 connected to a vertical passageway 97 in communication with a vertical passageway 98 extending upwardly from the inlet 5. The sleeve member 94, also, is provided with an annular seal 99 and a screw 100 passing through the side of the casing 1 into a recess 101 to hold the said sleeve member 94 as well as the tubular member 89 in place, and especially so that one of the apertures 95 registers with the passageway 97. The conical valve 87 has an upwardly directed tubular extension 102 provided with a series of peripheral annular liquid sealing recesses 103 fitting against the inner face of the sleeve 94. Also, in the interior of the conical valve member 87 there is a shoulder 104 supporting a valve-seating spring 105, which is somewhat lighter than the spring 70, the upper end of which spring 105 is supported within the sleeve 94. A split ring 106 in the interior of the casing 1 holds the sleeve 94 downwardly after being inserted through an opening 107 at the top of the casing 1. A narrow screw-threaded extension 108 of the sleeve 94 extends through said opening 107. On its upper end, the narrow extension 108 has a screw-threaded cap 109 provided with a flange 110 for cooperation with a flange 111 on a squared adjusting head 112 which is provided with a downwardly directed cylindrical extension 112a having a flat internal recess 113 between arms 114 and 115 which cooperate with opposing flat faces 116 and 117 on the upper end of a flat extension 118 of the plunger 44. By loosening the cap 109 and turning the squared head 112 the position of the screw-threaded block 53 on the screw-threaded portion 52 of the plunger 44 can be adjusted so as thereby to change the tension or compression of the spring 59 and alter the maximum pressure at which the relief valve will become unseated from its valve seat 90. It will be noted that when the pressure is relieved by the opening of the valve 87, 90, the liquid will pass through the fluted flange 88 and thence by a discharge passageway 119 to a discharge outlet port 120 leading to the low pressure chamber in said accumulator. Also, it will be noted that the construction is such that the plunger 44, block 55, sleeve 58, shells 66 and 69 with their springs 64 and 70, and sleeves 63 and 71 can be inserted together into the casing 1 when the cover 24 is removed. The conical valve 87, valve seat 90, and sleeve 94 are, of course, inserted from the top of the casing 1.

In the operation of my invention, it will be understood that a liquid or other fluid under pressure is being received through the inlet 5 and that the fluid then passes downwardly as well as upwardly through the vertical passageways 7 and 98 respectively. Normally, the liquid will pass through the check valve 8, 11 by unseating the same so as to pass through the outlet 30 to any desired apparatus or place for work-performance, as for instance in the power steering of the automobile as above referred to. The pressure liquid which passes out of the outlet 30, however, simultaneously, by means of the passageway 31, exerts its pressure upon the lower end of the plunger 44. Should the pressure from the outlet 30, and therefore in the chamber 32, on the lower end of the plunger 44 exceed the desired maximum determined by the adjusted position of the screw-threaded block 53 on the screw-threaded portion 52 of the plunger 44, the plunger 44 will be moved upwardly against the force of the spring 59 so as to force the tapered flange 76 past the balls 77 and 78, against the force of the spring 64 so as, suddenly, to move the tapered flange 76 to the other side of the said balls 77 and 78 by exerting a snap action movement so as to open the relief valve 87, 90 suddenly and permit the liquid from the passageway 98 to be relieved through the passageway 97 and thence by the passageway 119 to the outlet 120 which may lead to the low pressure chamber or exhaust chamber in the said accumulator. As soon, however, as the pressure in the chamber 32 is lowered below the desired maximum, the plunger 44 will be moved downwardly by the spring 59 and against the force of the spring 70 so as to move the tapered flange 76 to the lower or other side of the balls 77 and 78 with a snap action to close the apertured relief valve 87, 90 suddenly and effectively. After this, the high pressure liquid received by the inlet 5 will continue to pass downwardly to the outlet 30 for work performance in the usual way.

While I have described my invention above in detail I wish it to be understood that many changes may be made therein without departing from the spirit of the same.

I claim:

1. A fluid pressure unloading valve having a casing which encloses a fluid pressure responsive plunger as well as a spring opposing the movement of the plunger by said pressure fluid, said casing also having therein a pressure fluid inlet passage provided with a connection to said plunger, as well as a delivery outlet, a pressure fluid relief passage in said casing in communication with said inlet, a normally closed relief valve in the relief passage, a snap action device connected to said plunger for operating said valve, and a pressure fluid chamber communicating with one end of the plunger and through said connection to said pressure fluid inlet, said chamber having an opening in said casing provided with a cover, through which opening the plunger, spring and snap action device can be inserted, said chamber having a sealing stop-ring receiving one end of said plunger.

2. A fluid pressure unloading valve having a casing which encloses a fluid pressure responsive plunger as well as a spring opposing the movement of the plunger by said pressure fluid, said casing also having therein a pressure fluid inlet passage provided with a connection to said plunger, as well as a delivery outlet, a pressure fluid relief passage in said casing in communication with said inlet, a normally closed relief valve in the relief passage, a snap action device connected to said plunger for operating said valve, a pressure fluid chamber communicating with one end of the plunger and through said connection to said pressure fluid inlet, said chamber having an opening in said casing provided with a cover, through which opening the plunger, spring and snap action device can be inserted, and an adjusting means connected to the plunger for adjusting the tension of said spring having an adjusting element extending, so as to be accessible, through said casing at the other end of said plunger.

References Cited in the file of this patent

UNITED STATES PATENTS

| 2,210,295 | Johnson | Aug. 6, 1940 |
| 2,372,016 | Rockwell | Mar. 20, 1945 |
| 2,446,355 | Wright | Aug. 3, 1948 |

FOREIGN PATENTS

| 313,653 | Great Britain | June 17, 1929 |
| 862,340 | France | Nov. 30, 1940 |